(12) United States Patent
Szafraniec et al.

(10) Patent No.: US 8,213,810 B2
(45) Date of Patent: Jul. 3, 2012

(54) DEMODULATION OF AN OPTICAL SIGNAL UNDER CONTROL OF A KALMAN FILTER

(75) Inventors: Bogdan Szafraniec, Sunnyvale, CA (US); Todd Steven Marshall, Sunnyvale, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 412 days.

(21) Appl. No.: 12/489,117

(22) Filed: Jun. 22, 2009

(65) Prior Publication Data

US 2010/0322639 A1    Dec. 23, 2010

(51) Int. Cl.
*H04B 10/06* (2006.01)
(52) U.S. Cl. .................. 398/204; 398/203; 398/207
(58) Field of Classification Search ........... 398/202–214
See application file for complete search history.

(56) References Cited

U.S. PATENT DOCUMENTS

| | | | |
|---|---|---|---|
| 2004/0022547 A1* | 2/2004 | Szafraniec | 398/204 |
| 2004/0114939 A1* | 6/2004 | Taylor | 398/152 |
| 2010/0061487 A1* | 3/2010 | Kumar et al. | 375/322 |
| 2010/0138722 A1* | 6/2010 | Harley et al. | 714/762 |
| 2010/0178056 A1* | 7/2010 | Liu | 398/65 |

OTHER PUBLICATIONS

Andrew J. Viterbi and Audrey M. Viterbi, "Nonlinear Estimation of PSK-Modulated Carrier Phase with Application to Burst Digital Transmission", IEEE Transactions on Information Theory, vol. 29, No. 4, Jul. 1983, pp. 543-551.
Marvin K. Simon, "Optimum Receiver Structures for Phase-Multiplexed Modulations" IEEE Transactions on Communications, vol. 26, No. 6, Jun. 1978, pp. 865-872.
Peter S. Maybeck, Stochastic Models, Estimation and Control, vol. 1, Academic Press, Jun. 1979, Section 1.2 (pp. 3-15) and Section 5.3 (pp. 206-226).
Greg Welch and Gary Bishop, "An Introduction to Kalman Filter", Dept. of Computer Science, Univ. of North Carolina, Technical Report TR95-041, updated Jul. 24, 2006
R.E. Kalman, "A New Approach to Linear Filtering and Prediction Problems", Transactions of the ASME—Journal of Basic Engineering, 82 (Series D), 1960, pp. 35-45.

* cited by examiner

*Primary Examiner* — Dzung Tran

(57) ABSTRACT

An optical receiver and a method of demodulating an optical signal. The method includes combining a received optical signal with a local oscillator signal to construct a complex signal indicative of an optical field of the modulated optical signal and processing the complex signal recursively under control of a Kalman filter that enforces a constraint. The receiver includes an optical hybrid that combines a received optical signal with a local oscillator signal, a detector that recovers components of a complex signal, a processor that receives these components, and instructions that cause the processor to process the components of the complex signal recursively under control of a Kalman filter that enforces a constraint to recover data.

28 Claims, 11 Drawing Sheets

DEMODULATION OF AN OPTICAL SIGNAL UNDER CONTROL OF A KALMAN FILTER

BACKGROUND

In the simplest digital transmission link, data are sent in the form of zeros and ones that, for example, can be represented by on and off states of an oscillator signal that serves as a carrier. Turning the signal on and off can be viewed as a simple form of amplitude modulation having two states. Efficiency of the digital transmission link can be improved by using multiple states of amplitude modulation and phase modulation and, in the case of optical transmission, multiple polarization states of the carrier.

A simple form of digital phase modulation is binary phase-shift keying (BPSK) that allows two discrete states of phase of the carrier signal. A spectrally more efficient form of digital phase modulation is quadrature phase-shift keying (QPSK) in which the phase of the carrier signal can take any of four discrete states. Both BPSK and QPSK are particular kinds of n-ary phase-shift keying, a modulation format that allows n discrete states of the phase of the carrier.

Another family of digital modulation formats combines amplitude shift keying and phase shift keying. A subclass of these formats is sometimes denoted as quadrature amplitude modulation (QAM).

Regardless of the format of modulation used, signals modulated with data must be demodulated at the receiver to recover the data. Modulated signals are often received in a superheterodyne receiver having a local oscillator (LO). A signal from the LO is mixed with the received signal to generate an intermediate-frequency (IF) signal that may then be amplified and demodulated to recover the data.

Another approach is to lock the LO to the carrier frequency of the modulated signal by means of a phase-locked loop (PLL). A receiver embodying this technique is known as a homodyne receiver and can be viewed as a special case of a superheterodyne receiver in which the IF frequency is zero. In one version operating at optical frequencies, an optical modulated signal and an optical LO signal are combined and then detected in a square-law detector. The square-law detector produces a heterodyne beat signal at electrical frequencies that can be further processed to recover the data.

As the frequency of the carrier signal increases, the amount of data the signal can carry also increases, and, as a result, digital transmission has moved into optical frequency bands. Such systems use optical signals as carriers. These carriers have frequencies in the range of 200 TeraHertz (THz) and carry data at rates exceeding 100 gigabits/second (Gb/s). At these frequencies, traditional methods of demodulation, for example, methods that employ PLLs, are difficult to implement.

One solution to this problem is to use a receiver with a free-running LO. The nominal frequency of such an LO is nearly the same as that of the carrier but is not constant as the LO is not locked with a PLL and therefore the LO frequency may drift over time. The carrier frequency may also drift. The result is an IF signal with a frequency lower than the bandwidth of the modulated signal. The IF frequency is low but not constant and in general not equal to zero, and therefore such a receiver is strictly speaking neither homodyne nor heterodyne. This type of receiver is known as an intradyne receiver.

Optical oscillators, just like electrical oscillators, are not ideal. Their frequencies are not constant but exhibit some fluctuations. Since optical oscillators operate in the 200 THz range, these fluctuations can be many orders of magnitudes higher than those observed at electrical frequencies. These fluctuations are related to oscillator line width, which broadens with increasing phase noise. At optical frequencies this phase noise may become a significant issue.

As noted above, mixing an unlocked LO signal with an incoming modulated signal results in an IF signal of unknown frequency. The frequency of this IF signal must be estimated before the signal can be demodulated to recover the data. Any phase fluctuation of the IF signal must also be estimated and compensated for. An algorithm that is often used for this purpose in the case of n-ary phase-shift key modulation is the Viterbi-Viterbi algorithm. Typically this algorithm operates on frames of data (a "frame" of data is a data set of limited length) by finding a least square solution for an IF signal assumed to have a linear phase slope. However, if there is too much phase noise, frame-based processing that assumes a linear phase slope (constant IF) becomes unsuitable.

In addition to phase noise, there are other demodulation problems that have not been adequately addressed by existing methods of demodulation. For example, optical signals are subject to dispersion as they propagate through optical links, and the resulting distortion must be compensated. If two orthogonal polarization states are used for transmission, the polarization states must be identified and aligned in the receiver by means of optical or mathematical transformation of the received optical signal. Often the system clock and its phase must also be recovered from the incoming signal. Consequently, the modern optical receiver must be designed to perform a variety of functions including, among others, those listed above.

Accordingly, there has been a need for a way to demodulate a digitally-modulated optical signal.

SUMMARY OF THE INVENTION

A method of demodulating an optical signal according to an embodiment of the invention includes combining the optical signal with a local oscillator signal to recover components of a complex signal, and processing those components recursively under control of a Kalman filter that enforces a constraint to recover data from the complex signal.

An optical receiver embodying the invention includes an optical hybrid with a signal input, a local oscillator that provides a local oscillator signal to the optical hybrid, a detector in optical communication with the optical hybrid and operative to recover components of a complex signal that represents an optical field of a modulated optical signal received at the signal input, a processor in communication with the detector, and a storage unit containing instructions that cause the processor to process the components of the complex signal recursively under control of a Kalman filter that enforces a constraint to recover data from the complex signal.

DETAILED DESCRIPTION

Figure 1:
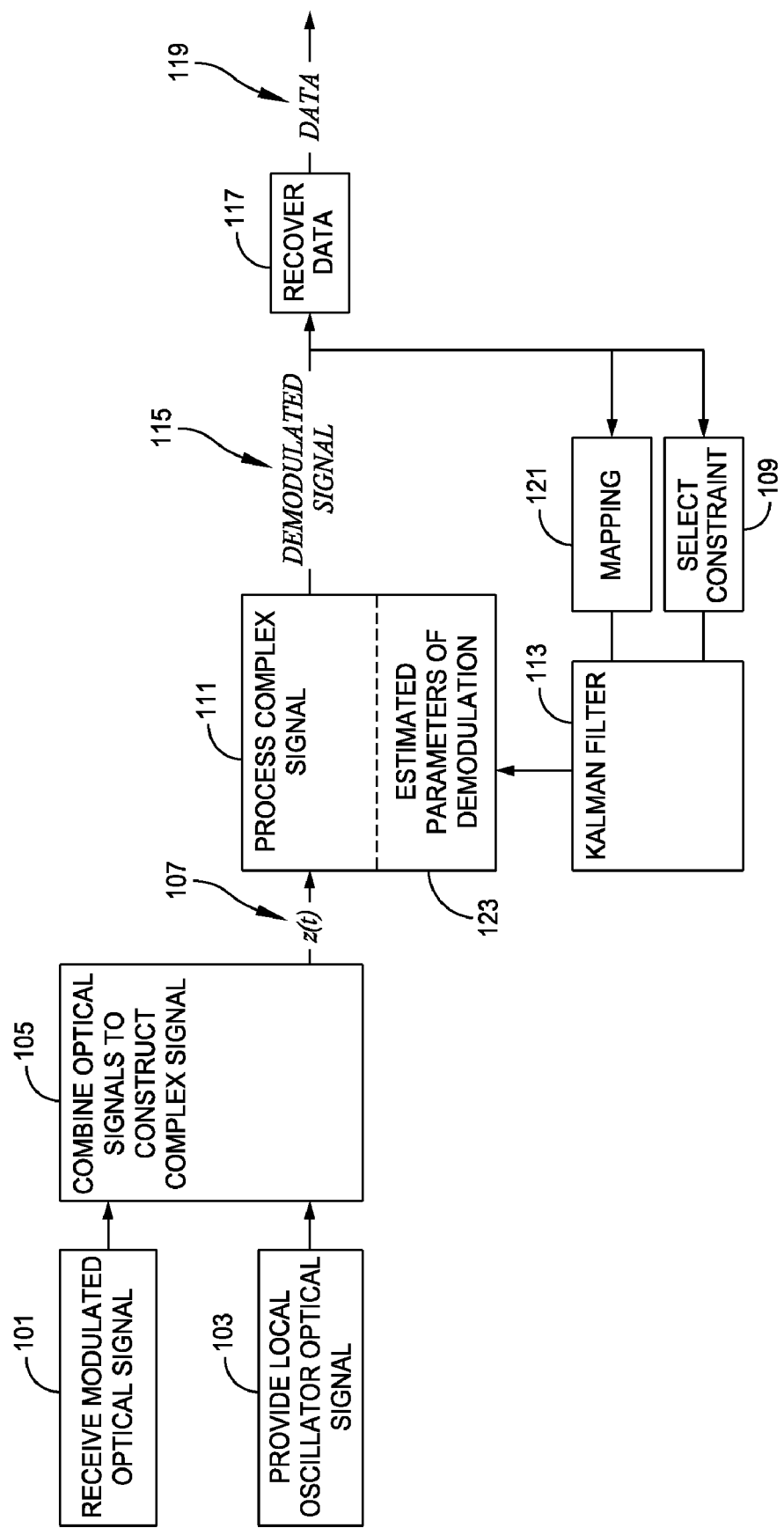
FIG. 1 depicts a method of demodulating an optical signal according to an embodiment of the invention.

As shown in FIG. 1, a method of demodulating an optical signal according to an embodiment of the invention includes receiving (101) in an optical receiver a modulated optical signal carrying data in a complex modulation format, providing (103) an optical local oscillator signal, combining (105) the optical signal with the local oscillator signal to construct a complex signal (107) indicative of an optical field of the modulated optical signal, selecting (109) a constraint, processing (111) the complex signal recursively under control of a Kalman filter (113) that enforces the selected constraint to provide a demodulated signal (115), and recovering (117) the data (119) from the demodulated signal.

Constructing the complex signal may be considered as translating the optical field of the received optical signal into an electrical signal that can be digitized and processed by computer.

In some embodiments a constant is selected as the constraint, as will be discussed in more detail presently, and the demodulated signal is mapped (121) onto the constraint, In these embodiments, the demodulated signal (115) is applied to the mapping (121) but not to the constraint (109) because the constraint is fixed. The mapping function may enforce a lock to a modulation format even if the complex signal changes in a random way.

In other embodiments the constraint is changed depending on the complex signal z(t). In these embodiments, the demodulated signal (115) is applied to the constraint (109). The constraint may switch between symbols of the complex modulation format. The symbol that is selected as a constraint may be different in each iteration of the Kalman filter. In some embodiments the constraint is always defined by a symbol that is nearest to the current value of the complex signal. In the case of a switching constraint, the mapping function preserves the values of its input.

Processing the components of the complex signal may include estimating one or more parameters of demodulation. The estimated demodulation parameters (123) are provided to the processing block (111). The parameter of demodulation may be, for example, the phase of the modulated optical signal, a sampling time, a polarization state of the modulated optical signal, a property of a medium through which the modulated optical signal propagates, or some other parameter.

The optical signal may be modulated in a complex modulation format which may be, for example, amplitude modulation or phase modulation. The modulation format may be n-ary phase-shift keying such as QPSK or BPSK. The format may be a combination of amplitude shift keying and phase shift keying such as QAM. Mathematically, the optical signal may be represented by a complex signal. In the heterodyne receiver the optical signal is mixed down to electrical frequencies. The components of the mixed down complex signal are recovered (105) at low electrical frequencies suitable for digitization and further processing. The recovered components of the complex signal may correspond to real and imaginary parts of the complex signal and the processing of these components may include mapping the real and imaginary parts onto the constraint.

In some embodiments the modulated optical signal comprises a polarization-multiplexed optical signal, and as described in more detail below two complex signals are recovered from two orthogonal polarization states of the optical signal. Such a polarization-multiplexed signal can be processed recursively by a Kalman filter that estimates orthogonal polarization states of the transmitted signals, the carrier phase, and sampling times.

Figure 2:
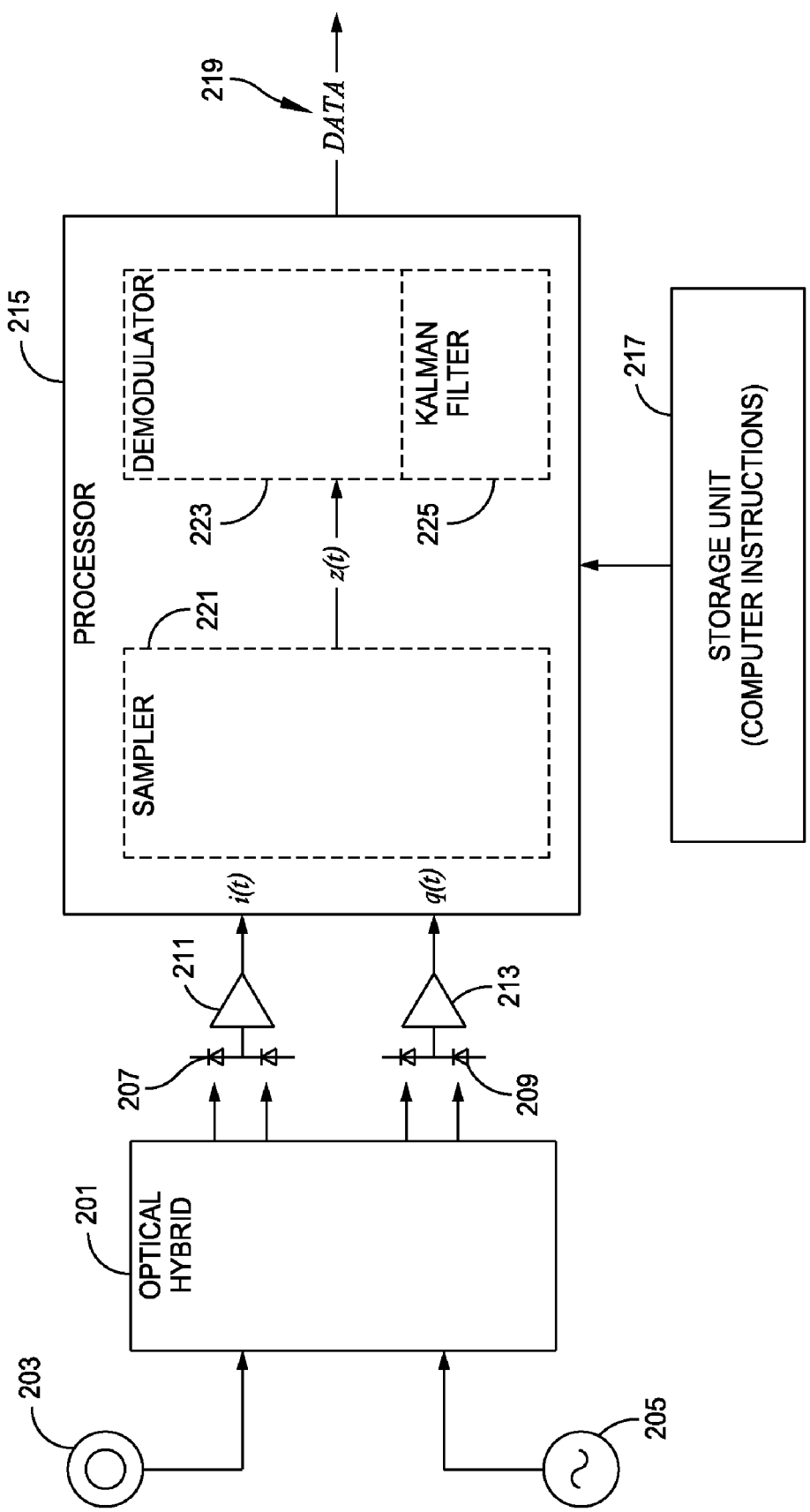
FIG. 2 is a block diagram of an optical receiver according to an embodiment of the invention.

As shown in FIG. 2, an optical receiver embodying the principles of the invention has an optical hybrid 201 with an optical signal input 203. The input 203 may be an optical connector coupled to the optical hybrid for connecting the hybrid to a link such as an optical fiber through which a modulated optical signal propagates. The optical hybrid may be a 90° optical hybrid such as a "mint 2×4" from Kylia Company, 10 Rue de Montmorency, 75003 Paris, France. A local oscillator 205 is operative to provide a local oscillator signal to the optical hybrid.

A detector in optical communication with the optical hybrid recovers components of a complex signal that represents the optical field of a modulated optical signal received at the signal input. Specifically, the detector provides electrical signals that contain heterodyne beat signals. In the embodiment shown, the detector includes a first balanced photodetector 207 and a second balanced photodetector 209 that provide in-phase and quadrature components i(t) and q(t), respectively, while subtracting common mode intensity noise. The components i(t) and q(t) represent a complex signal $z(t)=i(t)+jq(t)$, where $j=\sqrt{-1}$.

The balanced photodetector 207 may be in electrical communication with an amplifier 211. The balanced photodetector 209 may be in electrical communication with an amplifier 213.

A processor 215 receives the components of the complex signal. A storage unit 217 contains instructions operative to cause the processor 215 to process the components under control of a Kalman filter that enforces a constraint to recover data 219 from the complex signal in the manner described above.

The functioning of the processor is depicted by broken lines in FIG. 2. The complex components i(t) and q(t) which are provided by the detectors 207 and 209 in analog form, are digitized by a sampler 221. Thus, a sampler 221 samples the recovered components i(t) and q(t) to form the complex signal z(t). A demodulator 223 receives this complex signal and processes it to recover the data under control of a Kalman filter 225.

Although the functioning of the processor 215 has been depicted in terms of the elements 221, 223 and 225, it will be understood that these elements are only a visual representation of what happens in the processor 215 under control of the instructions from the storage unit 217. In some physical embodiments these elements may be physical circuit components or aggregations of such components, and in other embodiments the processor 215 may be embodied in a microprocessor (with any auxiliary chips that may be desired) that performs these functions.

The Kalman filter can estimate multiple parameters of the demodulation process including, among others, the sampling time. The Kalman filter may adjust the sampling time. Also, the sequential nature of the demodulation controlled by the Kalman filter allows for continuous adjustment of receiver parameters, which makes it possible to track fluctuations of carrier frequency or of the system clock and to track other parameters related to signal transmission.

Figure 3:
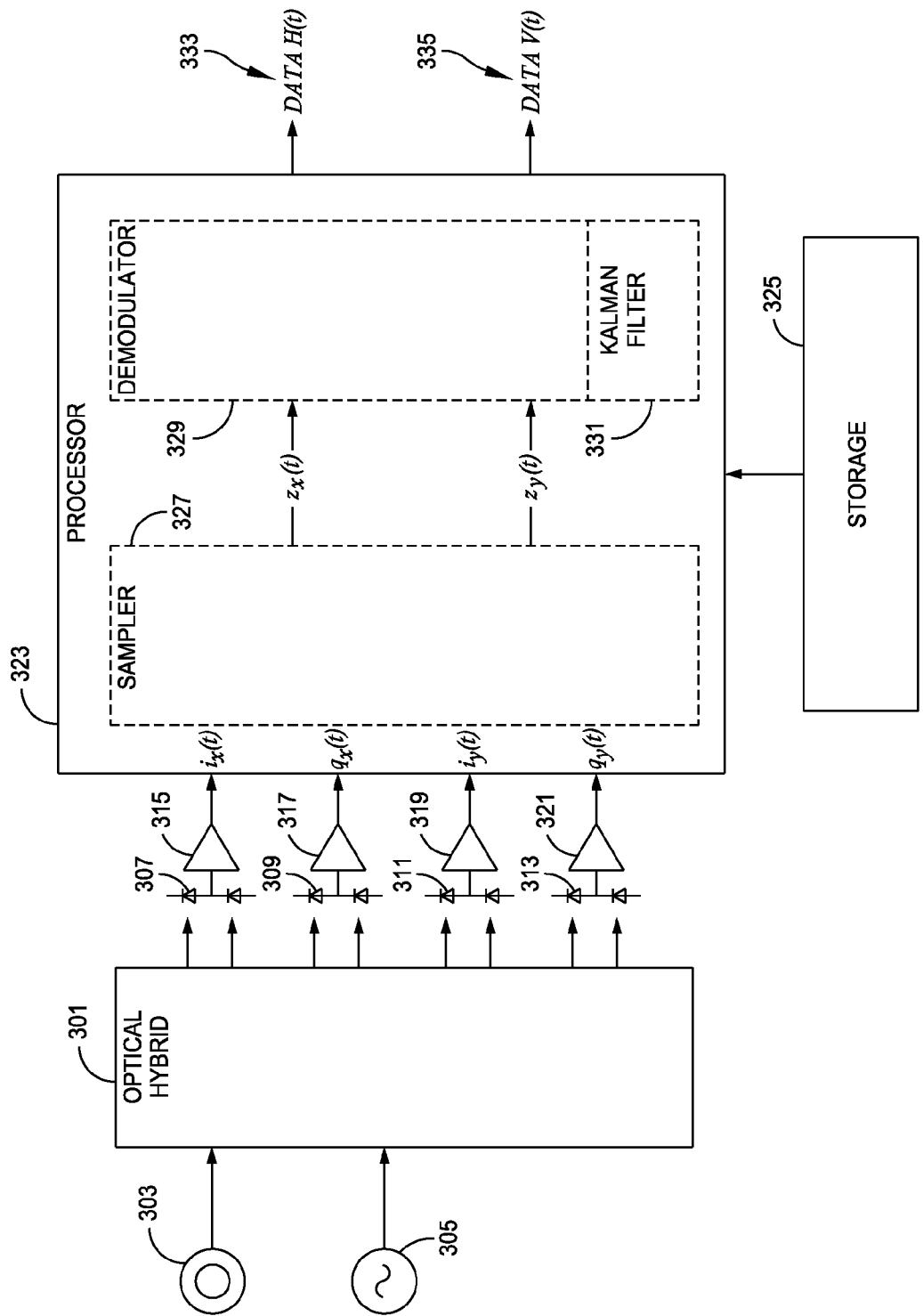
FIG. 3 is a block diagram of a polarization-multiplex optical receiver according to an embodiment of the invention.

An embodiment of a polarization-diverse optical receiver exemplifying the principles of the invention is shown in FIG. 3. A receiver according to this embodiment can recover two complex signals (variables) from an optical carrier signal. The recovered complex signals correspond to transmission in two orthogonal polarization states. The receiver recovers two complex variables that represent the optical field described by two components of the Jones vector. These two complex signals can be further processed to recover polarization states of transmission and ultimately the data transmitted in two orthogonal polarization states.

The receiver of FIG. 3 has a dual-polarization (polarization diverse) 90° optical hybrid 301 with an optical signal input 303. The optical hybrid may be a dual-polarization 90° optical hybrid such as a "mint 2×8" from Kylia Company. A local oscillator 305 is operative to provide a local oscillator signal to the optical hybrid.

A detector in optical communication with the optical hybrid recovers components of two complex signals from a polarization multiplexed modulated optical signal received at the signal input. The detector provides electrical signals that contain heterodyne beat signals. In the embodiment shown, the detector includes four balanced photodetectors. A first balanced photodetector 307 and a second balanced photodetector 309 provide in-phase and quadrature signals $i_X(t)$ and $q_X(t)$, respectively, while subtracting common mode intensity noise. Similarly, a third balanced photodetector 311 and a fourth balanced photodetector 313 provide in-phase and quadrature signals $i_Y(t)$ and $q_Y(t)$, respectively. The subscripts X and Y represent the polarization components that are separated by a polarizing beam splitter contained within the polarization diverse optical hybrid 301. Typically, the polarization states of the receiver, denoted here by X and Y, are different than polarization states of transmission, denoted here by H and V. The photodetectors may be in electrical communication with amplifiers 315 through 321, respectively.

A processor 323, comparable with the processor 215 of FIG. 2, receives the components of the two complex signals. A storage unit 325 contains instructions operative to cause the processor 323 to process the components under control of a Kalman filter that enforces a constraint to recover two data streams 333 and 335 from the complex signal in a manner similar to that described above.

Internal functions performed in the processor 323 are depicted in broken lines, but as with the embodiment shown in FIG. 2, these broken lines do not necessarily represent actual physical components. The recovered components $i_X(t)$ and $q_X(t)$ are combined, for example in a sampler 327, to form a first complex signal $z_X(t)$ for further processing. Similarly, the recovered components $i_Y(t)$ and $q_Y(t)$ are combined to form a second complex signal $z_Y(t)$.

In this embodiment the process of demodulation includes recovering the transmitted signals represented by the complex signals $z_H$ and $z_V$ from the received complex signals $z_X$ and $z_Y$. The demodulation may in addition include estimation of the residual carrier phase and sampling time. This may be done in a demodulator 329 including a Kalman filter 331 according to the principles of the invention, as previously described and as will be discussed in more detail below in connection with FIG. 11. Ultimately, the two data streams 333 and 335 represented respectively as H(t) and V(t) are recovered.

Following is a more detailed description of embodiments of the invention. This description is exemplary only. The principles of the invention may be embodied in other implementations of Kalman filters and other modulation formats.

General concepts of Kalman filters are available in a number of scientific publications and on-line resources. A useful general reference is "An Introduction to the Kalman Filter" by Greg Welch and Gary Bishop of the Department of Computer Science, University of North Carolina, Technical Report TR 95-041 (updated 24 Jul. 2006), available on-line at ftp://ftp.cs.unc.edu/pub/publications/techreports/95-041.pdf   More rigorous treatments of the topic of Kalman filters may be found in the Kalman paper itself: "A New Approach to Linear Filtering and Prediction Problems" by R. E. Kalman, *Transactions of the ASME—Journal of Basic Engineering*, pp. 35-45, March 1960; in *Stochastic Models, Estimation, and Control, Volume* 1 by Peter S. Maybeck, Academic Press Inc., 1979; and in other references listed in the Welch and Bishop report.

The Kalman filter in its conventional form estimates a set of parameters $x_k$ based on a set of measurements $z_k$. These parameters $x_k$ represent a discrete time process governed by a stochastic difference equation of the form:

$$x_k = A x_{k-1} + W_{k-1} \tag{1}$$

with a measurement that is:

$$z_k = h(x_k) + V_k \tag{2a}$$

which can be expressed in matrix form as:

$$z_k = H_k x_k + V_k \tag{2b}$$

where:
  $x_k$ is a column vector of state variables to be found,
  $z_k$ is a column vector of known measurements,
  A is an n×n matrix that relates the state at the previous time step k−1 to the state at the current step k,
  h is a known function,
  $H_k$ is a Jacobian matrix of partial derivatives of h (discussed below),
  W is a random variable representing process noise, and
  V is a random variable representing measurement noise.

Figure 4:
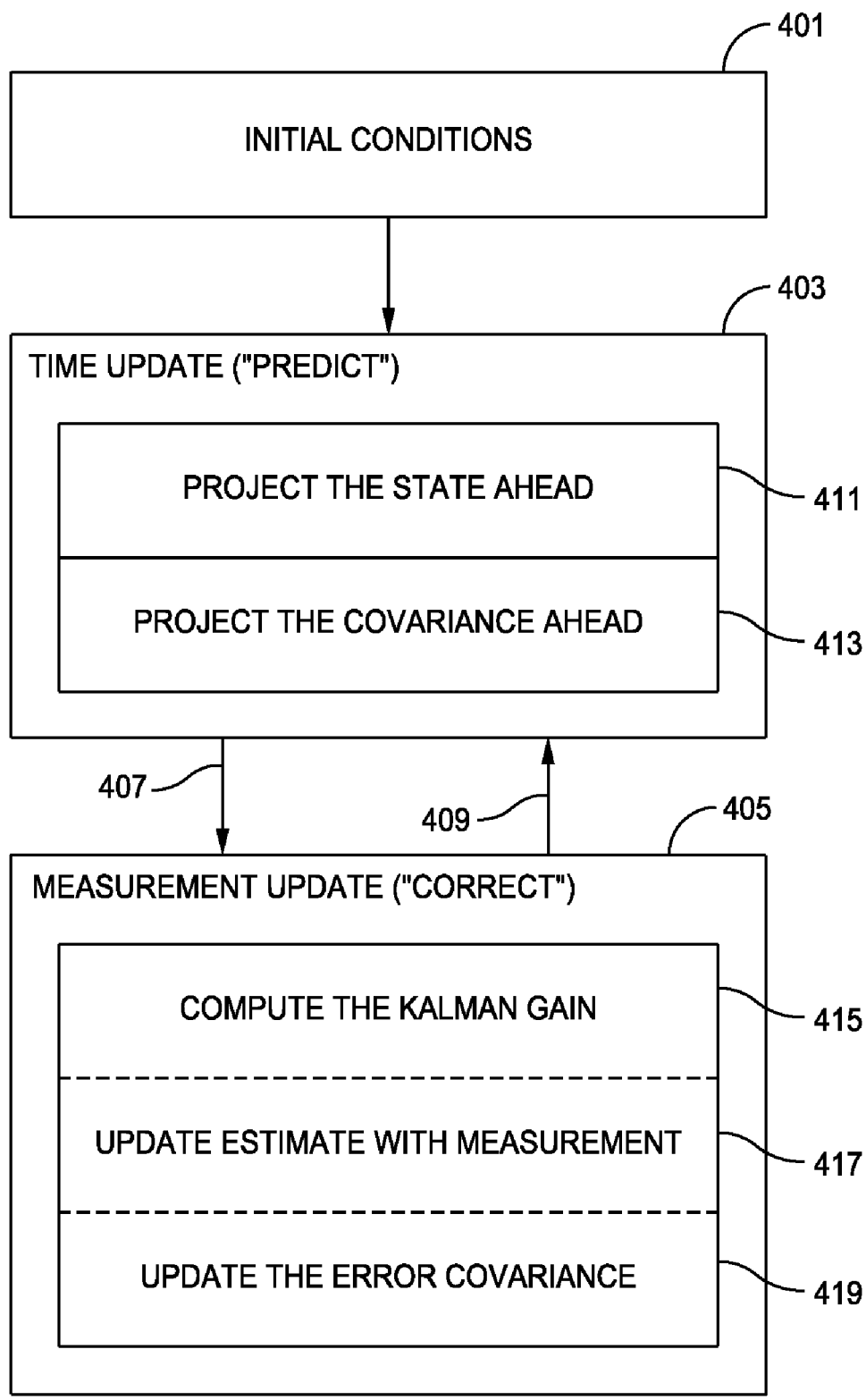
FIG. 4 depicts the functioning of a Kalman filter.

The algorithm of the Kalman filter is shown in outline form in FIG. 4. Initial conditions (block 401) include P, Q, R and $x_0$, where
  P is an error covariance matrix
  Q is a covariance matrix of process noise W, and
  R is a covariance matrix of measurement noise V.

Consecutive time updates (predictions) are calculated (block 403) and measurement updates (corrections) are calculated (block 405) recursively as indicated by an arrow 407 extending from block 403 to block 405 and an arrow 409 extending from block 405 to block 403.

Sub-block 411 of block 403 is "project the state ahead":

$$\bar{x}_k = A \hat{x}_{k-1} \tag{3}$$

where
  $\bar{x}_k$ is an a priori estimate, and
  $\hat{x}_k$ is an a posteriori estimate.

Sub-block 413 of block 403 is "project the covariance ahead":

$$M_k = A P_{k-1} A^T + Q \tag{4}$$

where
  $M_k$ is the projected error covariance matrix at the step k,
  $P_{k-1}$ is the error covariance matrix at the previous step k−1, and T represents a matrix transpose.

Sub-block 415 of block 405 is "compute the Kalman gain":

$$K_k = M_k H_k^T (H_k M_k H_k^T + R)^{-1} \quad (5)$$

where $K_k$ is the Kalman gain for the k-th sample.

Sub-block 417 of block 405 is "update estimate with measurement":

$$\hat{x}_k = \bar{x}_k + K_k(z_k - h(\hat{x}_k)) \quad (6)$$

Sub-block 419 of block 405 is: "update the error covariance":

$$P_k = (I - K_k H_k) M_k \quad (7)$$

where I is an identity matrix.

In the foregoing, H is the Jacobian matrix of partial derivatives of h with respect to estimated parameters contained in a vector x:

$$H_{[i,j]} = \frac{\partial h_{[i]}}{\partial x_{[j]}}(\bar{x}_k) \quad (8)$$

An intradyne optical receiver produces an electrical signal from detection of the optical signal. The electrical signal contains a heterodyne beat tone between the optical LO signal and the incoming optical signal. In the embodiment shown in FIG. 2 there are two electrical signals i and q that allow for a construction of a complex signal $z(t)=i(t)+jq(t)$. Hence, the receiver is capable of receiving any complex modulation formats that are not polarization multiplexed, including but not limited to BPSK, QPSK and QAM. The analytical signal z(t) represents a frequency-shifted copy of the original modulated optical signal. Assume that the signal is digitally modulated in phase only, and that its amplitude is constant and normalized to unity. Then, the normalized detected signals can be represented by:

$$i = \cos(\phi(t))$$

$$q = \sin(\phi(t)) \quad (9)$$

Figure 5:
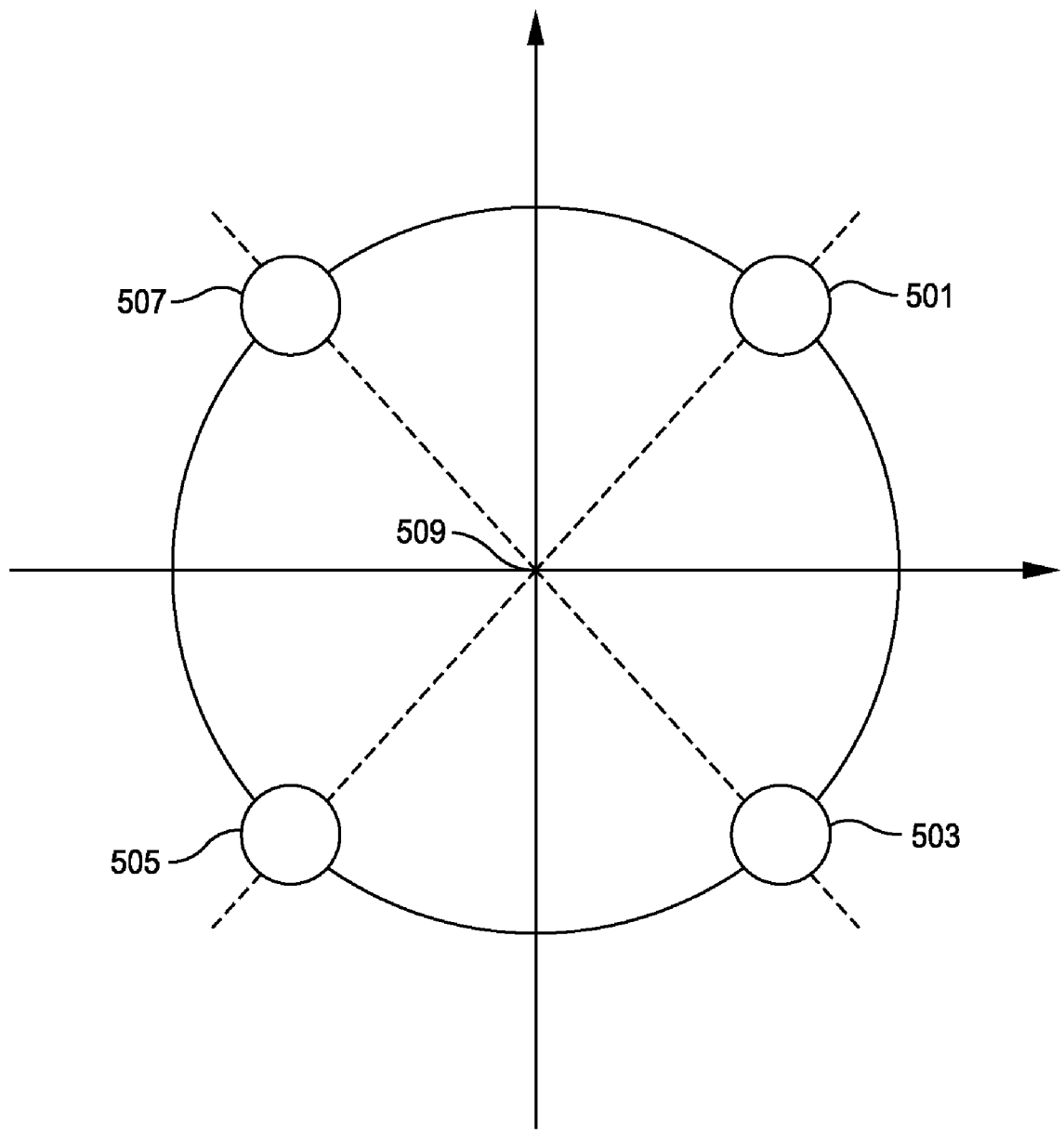
FIG. 5 is a constellation diagram showing QPSK modulation.

As shown in FIG. 5, in an ideal QPSK homodyne receiver, the data would always correspond to the points 501, 503, 505 and 507 on the constellation plot. Also, the data would change between the constellation points at intervals that are related to clock frequency. In a practical receiver the demodulated data may not be stationary but it may rotate clockwise or counterclockwise about the origin 509 at a rate that represents the difference in optical frequency between the LO and the incoming signal. This rotation may vary rapidly in time depending on the stability of the LO and the stability of the optical carrier of the incoming signal. Therefore, to observe a stationary constellation, the rotation that represents the carrier frequency must be removed. Also, the incoming data must be clocked at a correct clock frequency which initially may not be precisely known.

The following discussion shows how to determine the spin rate of the constellation (carrier frequency), the clock frequency, and the optimized sampling time using a Kalman filter controlled demodulation algorithm embodying the principles of the invention. The presented implementation of the Kalman filter assumes that the spin rate is low and that the clock frequency and phase are approximately known. These assumptions are not necessary, but they allow a more robust implementation of the Kalman filter. Thus, we assume that the clock frequency can be estimated by an independent method, for example by examining the spectrum of zz* where * represents complex conjugate. For an n-ary PSK modulation format, the approximate constellation spin rate (carrier frequency) can be found by examining the spectrum of $z^n$ where n=4 for QPSK. After subtracting a constant component of the spin, the constellation may still rotate at a slow rate clockwise or counterclockwise. This residual rotation is often called a carrier phase. The described initial steps that reduce the spin rate of the constellation and approximate preferred sampling times make the operation of the Kalman filter more reliable as they provide good initial guesses.

Figure 6:
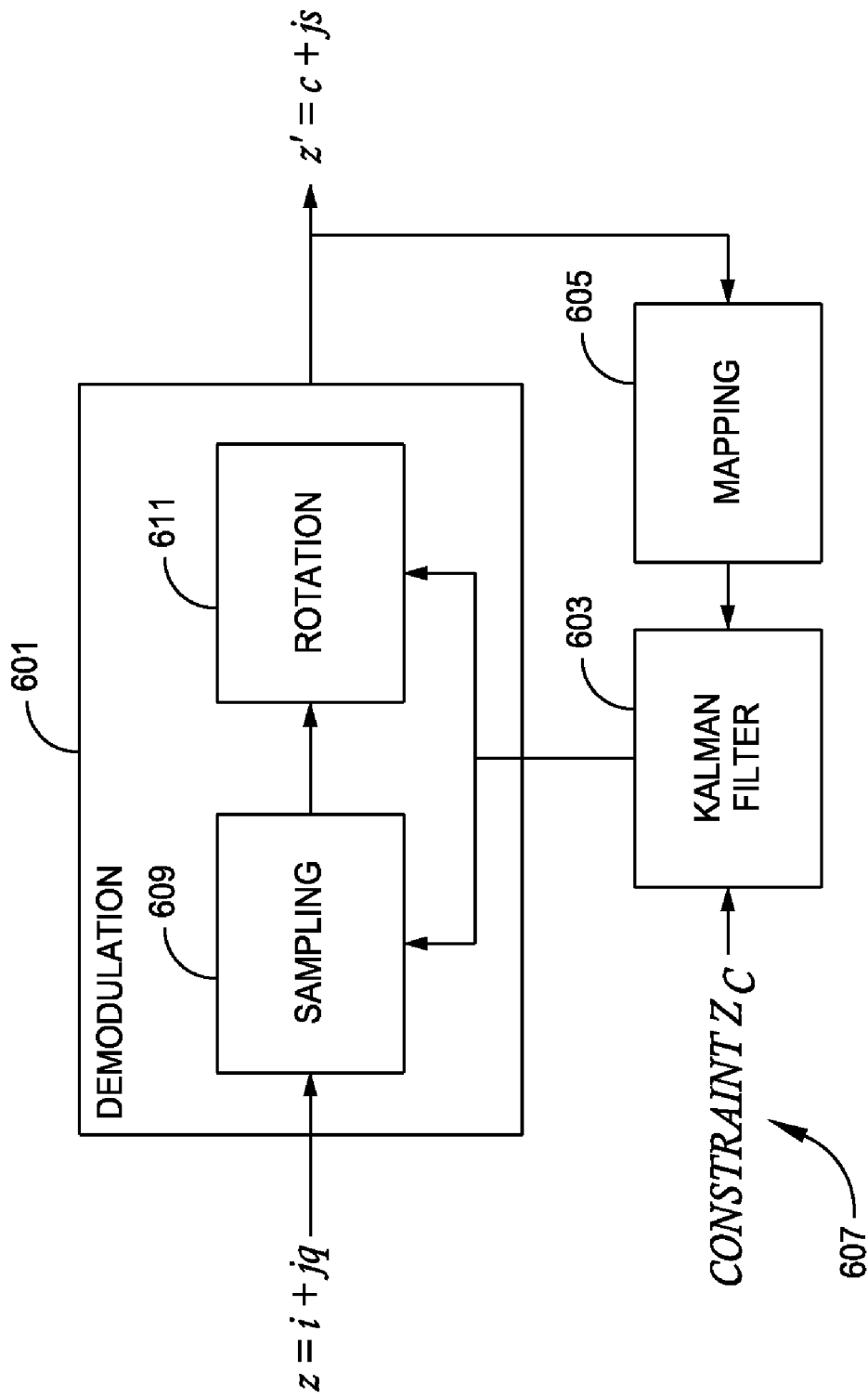
FIG. 6 is a diagram of a demodulation procedure controlled by a Kalman filter in accordance with the principles of the invention.

An embodiment of a demodulator controlled by a Kalman filter according to the principles of the invention is shown in FIG. 6. After subtracting a constant component of the constellation spin, the analytical signal $$z = i + jq$$

is provided to a demodulation block 601 that performs operations that produce a new complex signal $$z' = c + js.$$

The signal z' is fed back to a Kalman filter block 603 through a mapping block 605. Operation of the demodulation block is controlled by the Kalman filter. The mapping block maps multiple states comprising complex modulation formats onto a single constraint $Z_C$ 607. For example, the operation that maps the four states of the QPSK modulation onto the single constraint is $h(z')=(z')^4$. Examples of other possible mapping functions will be described below. The output $h(z')$ of the mapping block is provided to the Kalman filter block which in turn compares $h(z')$ with the constraint. If the constraint is not satisfied the Kalman filter modifies its estimate of the state variables vector $x_k$ that provides feedback to the demodulation block 601. The process is recursive and leads $h(z')$ toward the constraint $Z_C$. In other words, the Kalman filter minimizes the error between $h(z')$ and $Z_C$. This is equivalent to transforming the input signal $z=i+jq$ into the signal $z'=c+js$ that converges to a desired constellation in the complex plane. Often it is convenient to represent the complex signals z and z' by their real and imaginary components i and q, or c and s (quadrature components). The corrections that are made by the Kalman filter are influenced by the Jacobian matrix H, the form of which will be described below.

In an alternative embodiment mapping function 605 does not alter the complex signal. Instead the constraint, $Z_C$, switches between the symbols of the constellation. Thus, the set of allowed values of the constraint $Z_C$ is fixed; however, a different value is selected based on a current value of the complex variable z'. Typically, the selected constraint is the nearest symbol to the current complex variable z'. In this approach, the values of the complex variable z' are compared directly to the symbols comprising the modulation format.

In the embodiment shown, the demodulation block 601 includes a sampling element 609 that receives the sampling time $t_k$ from the state variable vector $x_k$ and a rotation element 611 that receives the rotation angle $\theta_k$ from the state variable vector $x_k$. The sampling block is capable of interpolating a complex function z that typically contains discrete samples of the digitized signals.

Consider recursive estimation of the sampling times $t_k$, clock period T, and rotation angle θ that result in aligning $z'=c+js$ with the QPSK constellation of FIG. 5. The following process equations are defined:

$$T_k = T_{k-1}$$

$$t_k = t_{k-1} + T_{k-1}$$

$$\theta_k = \theta_{k-1} \quad (10)$$

Equations (10) imply that clock period is about constant, sampling times occur at clock period intervals, and the rotation that aligns $z'=c+js$ with the points of the constellation of FIG. 5 is about constant. Approximately constant rotation implies that the rotation angle θ does not change significantly between adjacent samples but it may change slowly over intervals of many samples. Thus, the matrix A becomes $$A = \begin{pmatrix} 1 & 0 & 0 \\ 1 & 1 & 0 \\ 0 & 0 & 1 \end{pmatrix} \quad (11)$$

Now instead of complex variables z and z', use their real and imaginary components. The first operation performed on the signals i and q is the operation of sampling as shown in FIG. 6. The sampling times $t_k$ are provided to the sampling block 609 by the Kalman filter. After sampling, the points $i_k$ and $q_k$ are rotated by the angle $\theta_k$ and transformed into points $c_k$ and $s_k$. The rotation angle $s_k$ is also provided to the rotation block 611 by the Kalman filter. From the foregoing, the equations for $c_k$ and $s_k$ can be described as $$c_k = \cos(\phi(t_k) + \theta_k)$$

$$s_k = \sin(\phi(t_k) + \theta_k) \quad (12)$$

In complex notation:

$$z'_k = c_k + js_k = \exp(j\phi(t_k) + j\theta_k) \quad (13)$$

The mapping function raises the complex variable $Z'_k$ to the fourth power:

$$(z'_k)^4 = u_k + jv_k = \exp(4j\phi(t_k) + 4j\theta_k) \quad (14)$$

This defines measurement equations $$h_k = \begin{pmatrix} u_k \\ v_k \end{pmatrix} = \begin{pmatrix} \cos(4\varphi(t_k) + 4\theta_k) \\ \sin(4\varphi(t_k) + 4\theta_k) \end{pmatrix} \quad (15)$$

Ideally, after proper sampling and proper rotation, quantities of Equation (15) should be equal to a constant constraint $Z_C$:

$$Z_C = \begin{pmatrix} u_C \\ v_C \end{pmatrix} = \begin{pmatrix} -1 \\ 0 \end{pmatrix} \quad (16)$$

The above constraint enforces demodulated QPSK states shown in FIG. 5. In the Kalman filter algorithm shown in FIG. 6, the measurement update of vector $x_k$ is slightly altered and takes the following form:

$$\hat{x}_k = \bar{x}_k + K_k(Z_C - h_k) \quad (17)$$

This introduces the constraint given by equation (16) into a recursive algorithm of the Kalman filter.

The Kalman gain $K_k$ depends on a matrix H that contains partial derivatives of measurement Equation (15) with respect to the state variables $t_k$, $T_k$, and $\theta_k$:

$$H = \begin{pmatrix} \frac{\partial u_k}{\partial T_k} & \frac{\partial u_k}{\partial t_k} & \frac{\partial u_k}{\partial \theta_k} \\ \frac{\partial v_k}{\partial T_k} & \frac{\partial v_k}{\partial t_k} & \frac{\partial v_k}{\partial \theta_k} \end{pmatrix} \quad (18)$$

The matrix H influences the way the Kalman filter makes adjustments to the state variables. The matrix H as applied to the procedure illustrated in FIG. 6 is:

$$H = 4 \begin{pmatrix} 0 & -v_k \dot{\varphi}_k & -v_k \\ 0 & u_k \dot{\varphi}_k & u_k \end{pmatrix} \quad (19)$$

where $\dot{\phi}_k = d\phi(t)/dt$. The derivative of the angle $\phi_k$ can be calculated from $i_k$ and $q_k$ as:

$$\dot{\phi}_k = i_k \dot{q}_k - \dot{i}_k q_k \quad (20)$$

According to the principles of the invention the Kalman filter is placed within a feedback loop as described above. The filter affects the demodulation process and it monitors the conversion of the data to the desired format enforced by a constraint.

In an embodiment in which the mapping function does not alter the complex variable z' and the constraint switches between the symbols of the complex modulation format, the allowed constraint values are:

$$Z_C = \frac{1}{\sqrt{2}} \begin{pmatrix} 1 \\ 1 \end{pmatrix}, \frac{1}{\sqrt{2}} \begin{pmatrix} 1 \\ -1 \end{pmatrix}, \frac{1}{\sqrt{2}} \begin{pmatrix} -1 \\ 1 \end{pmatrix}, \frac{1}{\sqrt{2}} \begin{pmatrix} -1 \\ -1 \end{pmatrix}$$

Only one constraint is selected in each iteration based on the current value of the complex variable z' (nearest symbol). Since the mapping function does not change values of z' the matrix H contains the derivatives of the variables c and s:

$$H = \begin{pmatrix} \frac{\partial c_k}{\partial T_k} & \frac{\partial c_k}{\partial t_k} & \frac{\partial c_k}{\partial \theta_k} \\ \frac{\partial s_k}{\partial T_k} & \frac{\partial s_k}{\partial t_k} & \frac{\partial s_k}{\partial \theta_k} \end{pmatrix}$$

Thus, for the described example, $$H = \begin{pmatrix} 0 & -v_k \dot{\varphi}_k & -v_k \\ 0 & u_k \dot{\varphi}_k & u_k \end{pmatrix}$$

Constraints and mapping functions may take many different forms. For the described case of QPSK one could use a constraint:

$$Z_C = \begin{pmatrix} 0 \\ 0 \end{pmatrix} \quad (21)$$

and a mapping function:

$$h_k = \begin{pmatrix} \cos(c_k) \\ \cos(s_k) \end{pmatrix} \quad (22)$$

Figure 8:
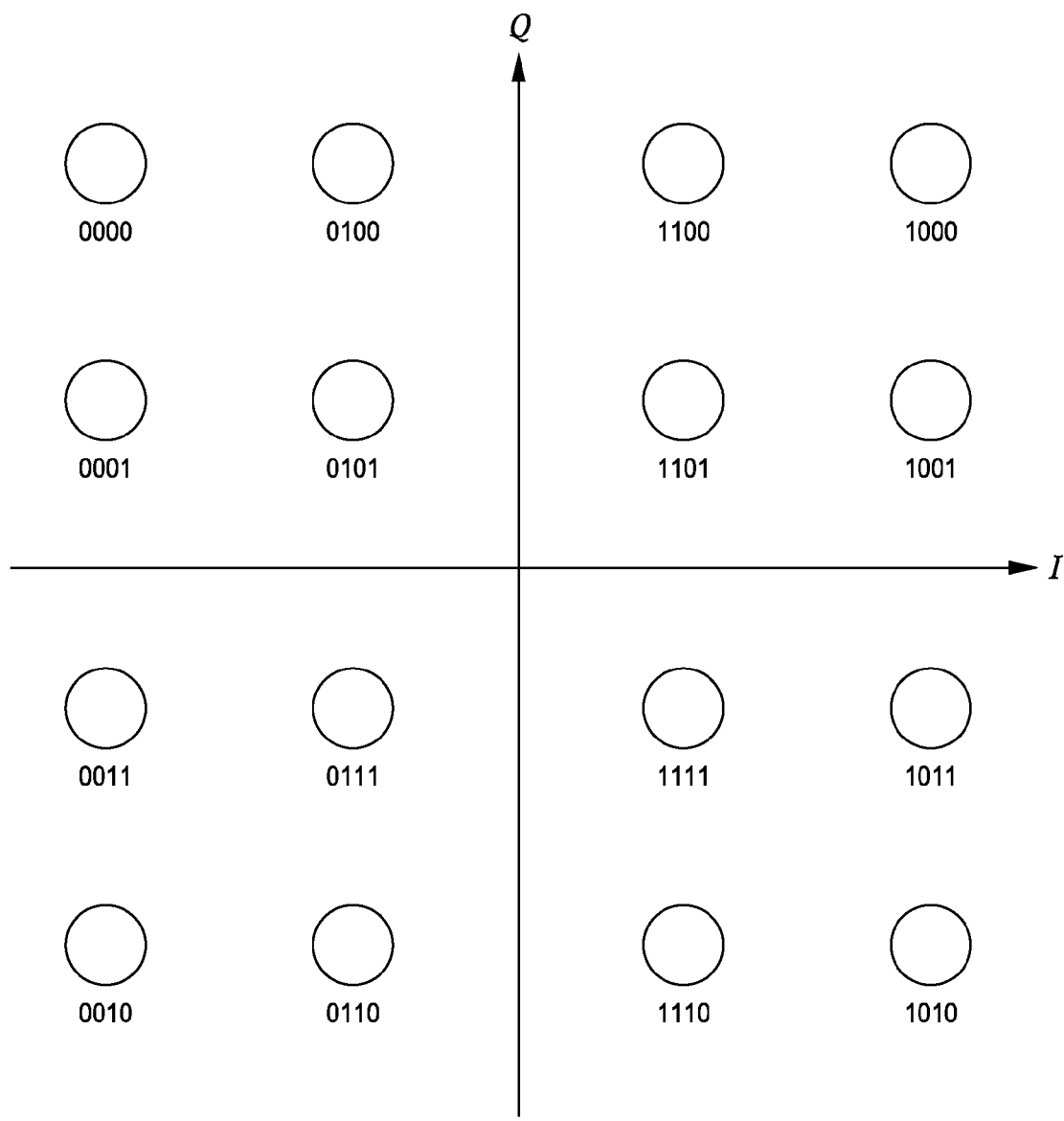
FIG. 8 is a constellation diagram showing QAM 16 modulation.

The mapping function of Equation (22) is suitable for demodulating other formats in addition to QPSK. For example, this function may be used for demodulating quadrature-amplitude modulation formats such as QAM 16, of which a constellation diagram is shown in FIG. 8.

Figure 7:
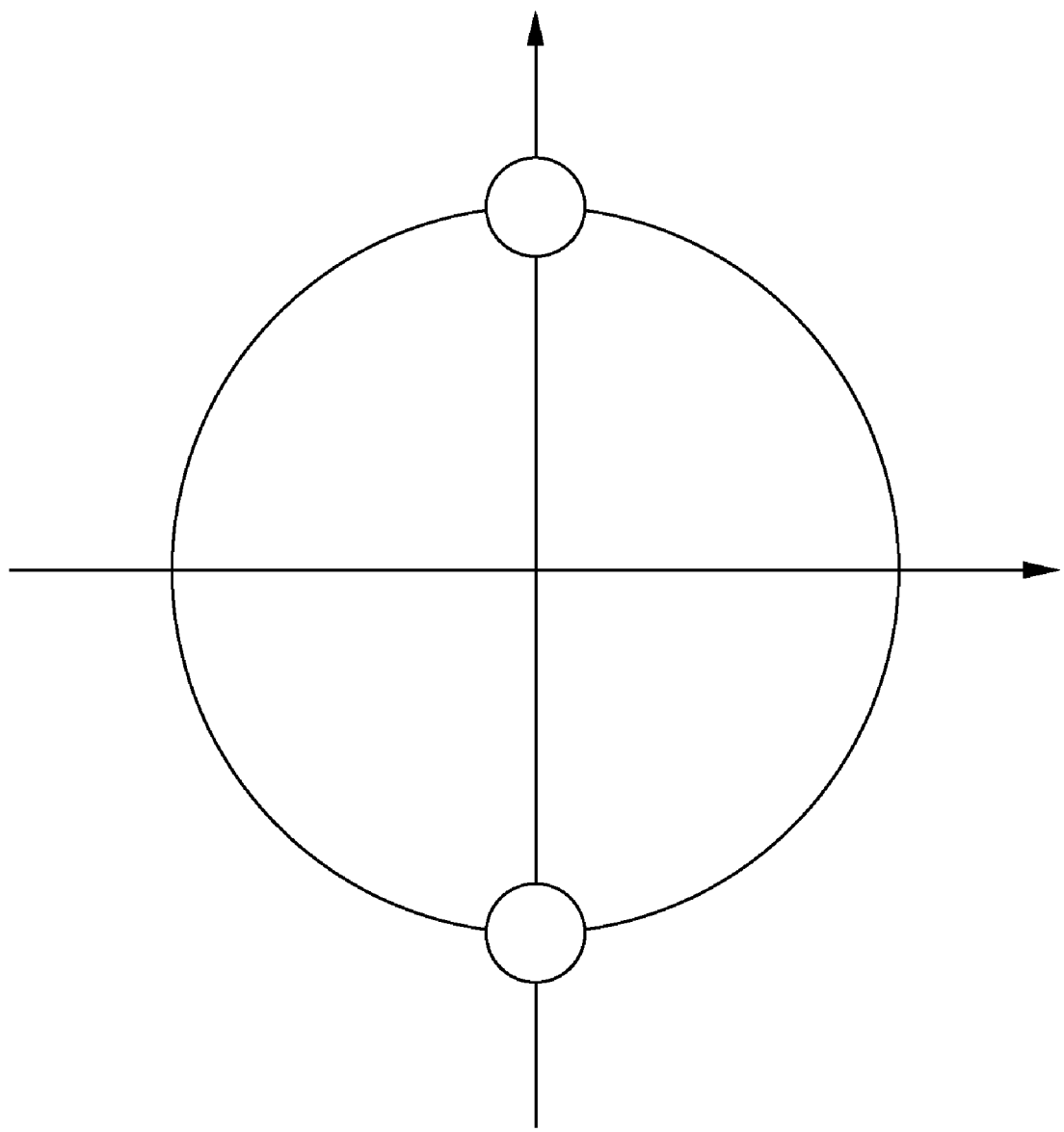
FIG. 7 is a constellation diagram showing BPSK modulation.

If the mapping function preserves the values of the complex signal z', the constraint is defined by the symbols of the modulation format. Thus, the constraint takes values illustrated in FIGS. 5, 7 and 8 for QPSK, BPSK, and QAM16, respectively.

Figure 9:
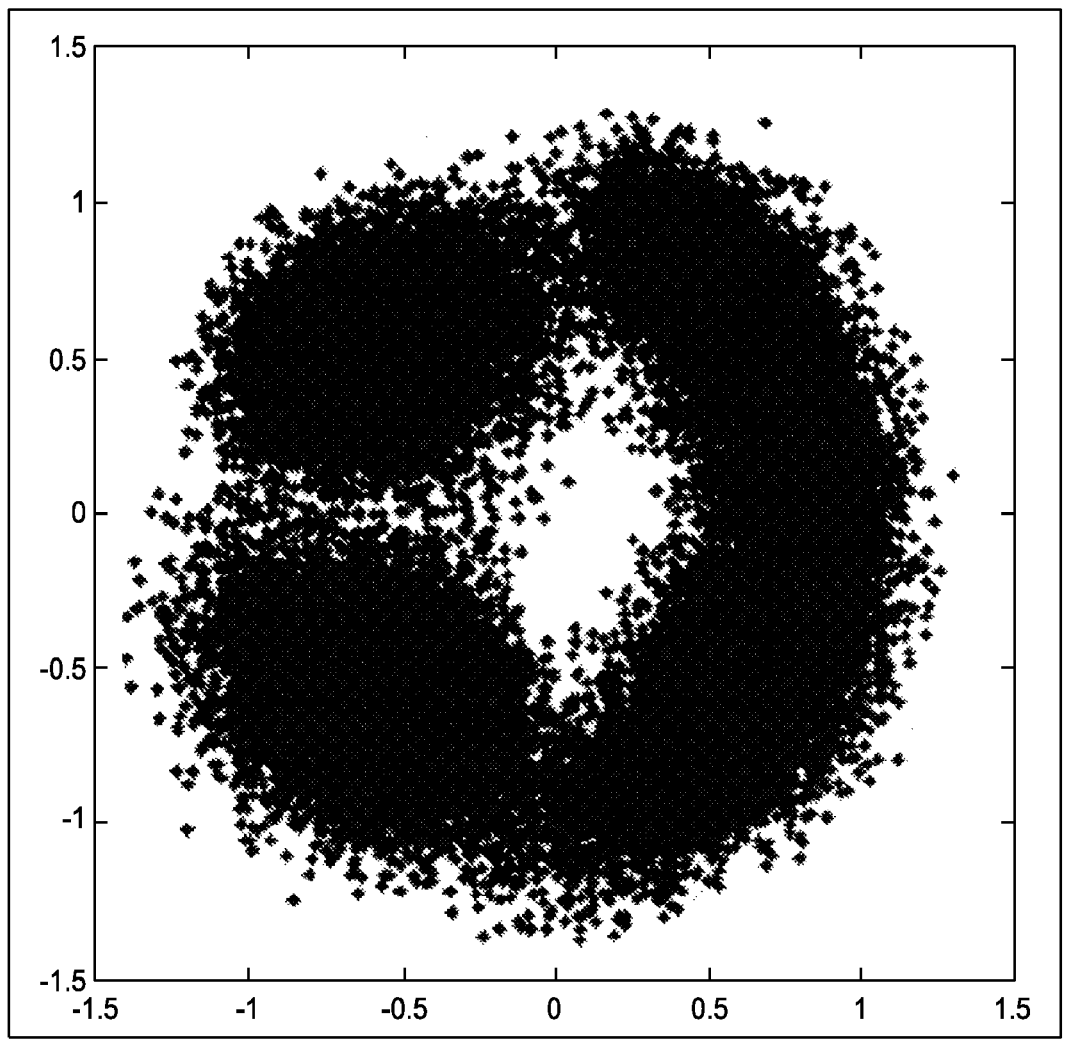
FIG. 9 shows demodulated QPSK data without subtraction of the residual phase of the carrier.
Figure 10:
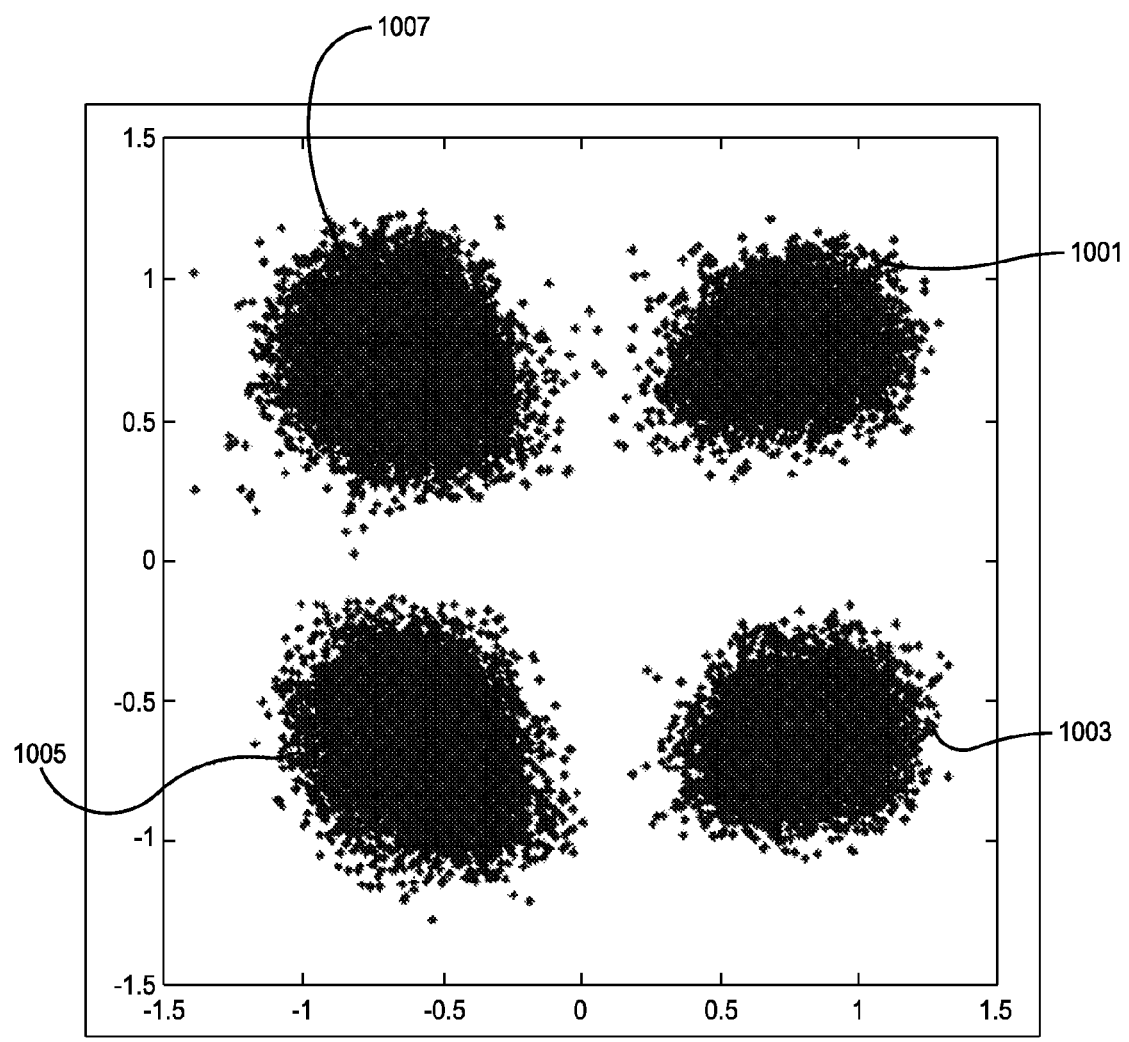
FIG. 10 shows demodulated QPSK data after subtraction of the residual phase of the carrier in accordance with the principles of the invention.

The result of applying the described Kalman filter demodulation to a set of experimental data is shown in FIGS. 9 and 10. As shown in FIG. 9, a simple demodulation without correction for the residual carrier phase yielded $z_k = i_k + q_k$ but recovery of the QPSK constellation failed as there is an overlap between the adjacent symbols. This is a consequence of the residual rotation due to the time-varying frequency offset between the optical signal carrier and the local oscillator signal. In contrast, as shown in FIG. 10, the algorithm based on the described Kalman filter yielded $z'_k = c_k + js_k$ in which the data were successfully separated into four distinct clusters 1001, 1003, 1005 and 1007.

A more detailed description of the embodiment shown in FIG. 3 will now be provided. In a typical polarization-multiplexed optical transmission system, an optical transmitter uses a polarization beam combiner (PBC) to combine two optical modulated signals represented by the complex variables $Z_H$ and $Z_V$ and having orthogonal polarization states. Each optical signal is modulated with a different stream of data in a modulation format of choice such as QPSK, QAM 16, or the like. The output of the PBC is an optical signal that carries the digital information of the two combined orthogonal optical signals. The output may be referred to as a "polarization-multiplexed optical signal".

A polarization-multiplexed optical signal propagates through an optical link to an optical receiver. However, as a result of birefringence in optical fiber, and because of the dependence of birefringence on environmental factors such as temperature and vibration, the polarization states of the two optical signals combined in the polarization-multiplexed optical signal change as the optical signal propagates through an optical link. As a result, when the polarization-multiplexed optical signal arrives at an optical receiver, the polarization states of the combined optical signals are different from what they were at the optical transmitter. For example, if the two combined optical signals were transmitted in horizontal and vertical polarization states, represented by the complex variables $Z_H$ and $Z_V$, it is almost a certainty that their polarization states will not be horizontal and vertical when they arrive at an optical receiver (although their orthogonal relationship will be maintained in the absence of polarization dependent loss). Therefore, at the receiver of FIG. 3, the recovered complex variables $Z_X$ and $Z_Y$ are different than the transmitted optical signals represented by $Z_H$ and $Z_V$. However, the complex variables $Z_X$ and $Z_Y$ are related to complex variables $Z_H$ and $Z_V$ by a matrix transformation. The estimation of this transformation effectively aligns the receiver and the transmitter.

Figure 11:
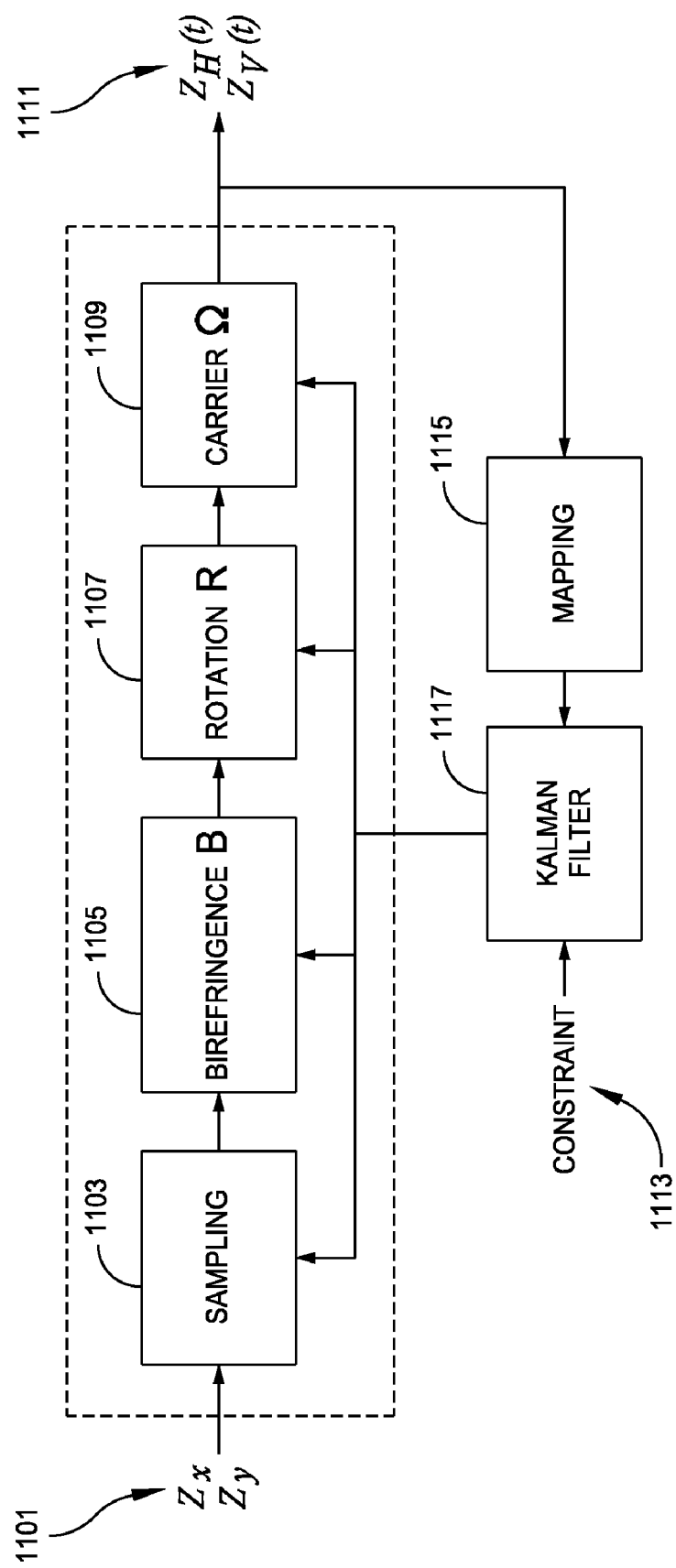
FIG. 11 depicts a method of restoring polarization states in a polarization-multiplexed optical signal according to an embodiment of the invention.

FIG. 11 depicts an embodiment of the demodulator 329 of FIG. 3. In the illustrated case, the horizontal and vertical components of the optical modulated signals represented by the complex variables $Z_H$ and $Z_V$ are misaligned with the principal axes X and Y of the receiver. In addition, the constellation is slowly rotating, and the initial sample times are slightly off. This Kalman filter implementation is similar to the previously described implementation in block 601 of FIG. 6 with the slowly rotating constellation and sampling time adjustment. However one important feature, polarization orientation, is added here to the Kalman state variables.

Polarization misalignment results in an input 1101:

$$Z_X = i_X(t) + jq_X(t)$$

$$Z_Y = i_Y(t) + jq_Y(t) \quad (28)$$

Each of the complex variables $Z_X$ and $Z_Y$ is a linear combination of $Z_H$ and $Z_V$. Therefore, finding the complex variables $Z_H$ and $Z_V$ relies on finding appropriate matrix transformation M. The matrix transformation M can be expressed in terms of two matrices: B and R. B is a linear birefringence matrix (block 1105) given by:

$$B = \begin{bmatrix} e^{j\psi/2} & 0 \\ 0 & e^{-j\psi/2} \end{bmatrix}$$

R is a rotation matrix (block 1107) given by:

$$R = \begin{bmatrix} \cos(\alpha) & \sin(\alpha) \\ -\sin(\alpha) & \cos(\alpha) \end{bmatrix}$$

Thus, the transformation of the polarization state depends on two parameters: $\alpha$ and $\psi$. In addition, the Kalman filter allows for control of the sampling time that might be different for two input complex variables $Z_X$ and $Z_Y$. The deviation from the initial sampling time is denoted here by $\Delta t_X$ and $\Delta t_Y$. Also, the Kalman filter may compensate for the residual carrier phase of the complex variables $Z_H$ and $Z_V$ denoted here by OH and $\theta_V$.

The complex inputs of Eq. (28) are processed by the demodulator through a sampling block 1103, the birefringence block 1105, the rotation block 1107, and a carrier phase block 1109 to provide demodulated complex signals $Z_H$ and $Z_V$ at the output 1111. The Kalman filter provides parameter estimates to each of these demodulator blocks based on the state definition.

The Kalman state vector consists of two deviations from the original sampling times, $\Delta t_X$ and $\Delta t_Y$, two polarization angles, $\alpha$ and $\psi$, and two carrier phase rotations, $\theta_H$ and $\theta_V$, as shown in the following equation:

$$x_k = \begin{pmatrix} \Delta t_X \\ \Delta t_Y \\ \alpha \\ \psi \\ \theta_H \\ \theta_V \end{pmatrix} \quad (29)$$

For the Kalman filter to start, the initial state must be defined (block 401 of FIG. 4). A practical and well-behaved assumption is that the sampling time deviations are small and can be initially approximated as zero. As described above, the spin rate (carrier frequency) is estimated by examining the input spectrum raised to the $n^{th}$ power where n=4 for QPSK. The constellation rotation (spin) is subtracted to produce a nearly stationary constellation such that $\theta_H$ and $\theta_V$ are initially approximated as zero. The initial polarization ($\alpha$ and $\psi$) is estimated independently by finding the best fit plane in Stokes space of a sufficient set of measured input samples.

The two polarization angles, $\alpha$ and $\psi$, by means of the birefringence block 1105 and rotation block 1107, determine the alignment of the principal axes of the receiver to the incident polarization-multiplexed modulated optical signal. The polarization state is not required to be constant in this formulation which allows the Kalman filter to track $\alpha$ and $\psi$ as they evolve in time. The only restriction is that $\alpha$ and $\psi$ are approximately constant over each Kalman iteration interval.

Mathematically, shifting the sampling time (block 1103) is expressed as:

$$Z_X(t + \Delta t_X)$$

$$Z_Y(t + \Delta t_Y)$$

Carrier phase rotation $\Omega$ (block 1109) utilizes the two carrier phase rotation estimates to stop the residual constellation spin of the two demodulated optical signals and is expressed as:

$$\Omega = \begin{bmatrix} e^{j\theta_H} & 0 \\ 0 & e^{j\theta_V} \end{bmatrix} \quad (33)$$

The demodulated output 1111 is related to the inputs 1101 by the following equation:

$$\begin{pmatrix} Z_H \\ Z_V \end{pmatrix} = \begin{bmatrix} e^{j\theta_H} & 0 \\ 0 & e^{j\theta_V} \end{bmatrix} \begin{bmatrix} \cos\alpha & \sin\alpha \\ -\sin\alpha & \cos\alpha \end{bmatrix} \begin{bmatrix} e^{j\psi/2} & 0 \\ 0 & e^{-j\psi/2} \end{bmatrix} \begin{pmatrix} Z_X(t+\Delta t_X) \\ Z_Y(t+\Delta t_Y) \end{pmatrix} \quad (34)$$

For QPSK modulation, the Kalman filter mapping 1115 uses the H and V complex signals raised to the fourth power. Hence, the Kalman filter measurement is defined as:

$$h = \begin{pmatrix} Z_H^4 \\ Z_V^4 \end{pmatrix} \quad (35)$$

After proper time sampling, carrier rotation, and polarization orientation alignment, the quantities of Eq. (35) should be ideally equal to a constant constraint $Z_C$ 1113 given by:

$$Z_c = \begin{pmatrix} -1 + j0 \\ -1 + j0 \end{pmatrix} \quad (36)$$

As described previously, the demodulated signal 1111 is mapped in mapping block 1115 according to the mapping function Eq. (35) and then is applied to the Kalman filter 1117. The Kalman filter controls the demodulator according to the constraint 1113 to correct the polarization, constellation spin, and time samples and to recover the two original complex signals, $Z_H$ and $Z_V$.

In the above description, the subscripts, that are typically used to describe the recursive operation of the Kalman filter, were omitted for simplicity.

It is important to comment on calculating the matrix H. As described above, the matrix H contains the derivatives of h with respect to the estimated parameters. However, the derivatives of $Z_H^4$ and $Z_V^4$ can be found from the derivatives of $Z_H$ and $Z_V$ by using the following relationships:

$$\frac{\partial \text{Re}(Z^4)}{\partial u} = \text{Re}\left(4Z^3 \frac{\partial Z}{\partial u}\right)$$

$$\frac{\partial \text{Im}(Z^4)}{\partial u} = \text{Im}\left(4Z^3 \frac{\partial Z}{\partial u}\right)$$

In an alternative embodiment, the mapping function preserves the values of $Z_H$ and $Z_V$; however, the constraint switches between the discrete symbols of the complex modulation format. For polarization-multiplexed optical signals, the constraint contains two complex numbers as in Eq. (36). The selected values of the constraint are the nearest symbols to the current values of the complex variables $Z_H$ and $Z_V$.

As can be seen from the foregoing, a demodulator controlled by a Kalman filter according to the principles of the invention can be used in various ways to demodulate signals carried by optical carriers having frequencies in the 200 THz range. This process can also be applicable to properties of the optical link that include, but are not limited to, chromatic dispersion and polarization mode dispersion.

While certain embodiments of the invention have been described and illustrated, variations and changes may be made without departing from the principles of the invention. The invention is not to be limited by the foregoing description and drawings but only by the claims.

We claim:

1. A method of demodulating an optical signal comprising:
   (a) receiving in an optical receiver a modulated optical signal;
   (b) providing a local oscillator signal;
   (c) combining the modulated optical signal with the local oscillator signal to construct a complex signal indicative of an optical field of the modulated optical signal;
   (d) selecting a constant constraint;
   (e) processing components of the complex signal recursively under control of a Kalman filter that enforces the selected constraint to provide a demodulated signal, wherein the processing comprises mapping the complex signal onto the constant constraint; and
   (f) recovering data from the demodulated signal.

2. A method as in claim 1 wherein the modulated optical signal comprises an optical signal modulated by at least one of amplitude modulation and phase modulation.

3. A method as in claim 2 wherein the modulated optical signal is modulated by n-ary phase-shift keying.

4. A method as in claim 1 wherein step (e) comprises mapping real and imaginary parts of the complex signal onto the constraint.

5. An optical receiver comprising:
   an optical hybrid having a signal input;
   a local oscillator operative to provide a local oscillator signal to the optical hybrid;
   a detector in optical communication with the optical hybrid and operative to recover components of a complex signal that represents an optical field of a modulated optical signal received at the signal input;
   a processor in communication with the detector and operative to receive the components of the complex signal; and
   a storage unit containing instructions operative to cause the processor to process the components of the complex signal recursively under control of a Kalman filter that enforces a constraint to recover data from the complex signal, wherein the instructions cause the processor to execute a mapping function that provides an input to the Kalman filter.

6. An optical receiver as in claim 5 wherein the optical hybrid comprises a dual-polarization 90° optical hybrid.

7. An optical receiver as in claim 5 wherein the detector recovers components of more than one complex signal from the optical signal.

8. A method of demodulating an optical signal comprising:
   (a) receiving in an optical receiver a modulated optical signal;
   (b) providing a local oscillator signal;
   (c) combining the modulated optical signal with the local oscillator signal to construct a complex signal indicative of an optical field of the modulated optical signal;
   (d) selecting a constraint from among a plurality of symbols of a modulation format;

(e) processing components of the complex signal recursively under control of a Kalman filter that enforces the selected constraint to provide a demodulated signal; and (f) recovering data from the demodulated signal.

9. A method as in claim 8 wherein the selected symbol comprises that symbol which is nearest to a current value of the processed complex signal.

10. A method as in claim 8 wherein the modulated optical signal comprises an optical signal modulated by at least one of amplitude modulation and phase modulation.

11. A method as in claim 10 wherein the modulated optical signal is modulated by n-ary phase-shift keying.

12. A method as in claim 8 wherein step (e) comprises mapping real and imaginary parts of the complex signal onto the constraint.

13. A method of demodulating an optical signal comprising:

(a) receiving in an optical receiver a modulated optical signal;

(b) providing a local oscillator signal;

(c) combining the modulated optical signal with the local oscillator signal to construct a complex signal indicative of an optical field of the modulated optical signal;

(d) selecting a constraint;

(e) processing components of the complex signal recursively under control of a Kalman filter that enforces the selected constraint to provide a demodulated signal, wherein the processing comprises estimating a parameter of demodulation; and (f) recovering data from the demodulated signal.

14. A method as in claim 13 wherein the parameter of demodulation comprises a residual carrier phase.

15. A method as in claim 13 wherein the parameter of demodulation comprises sampling time.

16. A method as in claim 13 wherein the parameter of demodulation comprises a polarization state transformation parameter.

17. A method as in claim 13 wherein the parameter of demodulation comprises a property of a medium through which the modulated optical signal propagates.

18. A method as in claim 13 wherein the modulated optical signal comprises an optical signal modulated by at least one of amplitude modulation and phase modulation.

19. A method as in claim 18 wherein the modulated optical signal is modulated by n-ary phase-shift keying.

20. A method as in claim 13 wherein step (e) comprises mapping real and imaginary parts of the complex signal onto the constraint.

21. A method of demodulating an optical signal comprising:

(a) receiving in an optical receiver a modulated optical signal;

(b) providing a local oscillator signal;

(c) combining the modulated optical signal with the local oscillator signal to construct a complex signal indicative of an optical field of the modulated optical signal, wherein the modulated optical signal comprises a polarization-multiplexed signal, and the combining the modulated optical signal comprises constructing two complex signals indicative of optical fields of the polarization-multiplexed signal;

(d) selecting a constraint;

(e) processing components of the complex signal recursively under control of a Kalman filter that enforces the selected constraint to provide a demodulated signal; and (f) recovering data from the demodulated signal.

22. A method as in claim 21 wherein the modulated optical signal comprises an optical signal modulated by at least one of amplitude modulation and phase modulation.

23. A method as in claim 22 wherein the modulated optical signal is modulated by n-ary phase-shift keying.

24. A method as in claim 21 wherein step (e) comprises mapping real and imaginary parts of the complex signal onto the constraint.

25. An optical receiver comprising:

an optical hybrid having a signal input;

a local oscillator operative to provide a local oscillator signal to the optical hybrid;

a detector in optical communication with the optical hybrid and operative to recover components of a complex signal that represents an optical field of a modulated optical signal received at the signal input;

a processor in communication with the detector and operative to receive the components of the complex signal; and a storage unit containing instructions operative to cause the processor to process the components of the complex signal recursively under control of a Kalman filter that enforces a constraint to recover data from the complex signal, wherein instructions that cause the processor to switch the constraint between symbols of a complex modulation format.

26. An optical receiver as in claim 25 and further comprising instructions that cause the processor to switch the constraint between symbols of a complex modulation format.

27. An optical receiver as in claim 25 wherein the optical hybrid comprises a dual-polarization 90° optical hybrid.

28. An optical receiver as in claim 25 wherein the detector recovers components of more than one complex signal from the optical signal.

* * * * *